United States Patent
Kuehner et al.

(10) Patent No.: US 12,344,275 B2
(45) Date of Patent: Jul. 1, 2025

(54) SYSTEMS AND METHODS FOR AVOIDANCE OF EXTERNAL ODORS IN A VEHICLE

(71) Applicant: Woven by Toyota, Inc., Tokyo (JP)

(72) Inventors: Manuel Ludwig Kuehner, Mountain View, CA (US); Hiroshi Yasuda, San Francisco, CA (US)

(73) Assignee: Woven By Toyota, Inc., Tokyo (JP)

( * ) Notice: Subject to any disclaimer, the term of this patent is extended or adjusted under 35 U.S.C. 154(b) by 279 days.

(21) Appl. No.: 18/096,893

(22) Filed: Jan. 13, 2023

(65) Prior Publication Data

US 2024/0239375 A1    Jul. 18, 2024

(51) Int. Cl.
   *B60W 60/00*   (2020.01)
   *B60H 1/00*    (2006.01)
   *B60W 30/18*   (2012.01)

(52) U.S. Cl.
   CPC ......... *B60W 60/0015* (2020.02); *B60H 1/008* (2013.01); *B60H 1/00849* (2013.01); *B60W 30/18163* (2013.01); *B60W 2554/4041* (2020.02); *B60W 2710/30* (2013.01); *B60W 2754/30* (2020.02)

(58) Field of Classification Search
   CPC ....... B60W 60/0015; B60W 30/18163; B60W 2554/4041; B60W 2754/30; B60W 2710/30; B60H 1/008; B60H 1/00849
   See application file for complete search history.

(56) References Cited

U.S. PATENT DOCUMENTS

| | | | |
|---|---|---|---|
| 11,201,405 B2 | 12/2021 | Tran et al. | |
| 11,505,213 B2* | 11/2022 | Panttila | B60W 60/00182 |
| 11,648,817 B2* | 5/2023 | Günzel | B60H 1/00771 |
| | | | 701/36 |
| 11,847,914 B2* | 12/2023 | Wingfield | B60H 1/008 |
| 2002/0139251 A1 | 10/2002 | Simmons | |
| 2018/0319406 A1* | 11/2018 | Dudar | B60H 1/00357 |
| 2018/0326811 A1* | 11/2018 | Chelian | B60H 1/00771 |
| 2018/0334013 A1 | 11/2018 | Koravadi | |
| 2019/0084369 A1 | 3/2019 | Duan et al. | |
| 2019/0308487 A1* | 10/2019 | Badger, II | B60H 1/00821 |
| 2019/0329791 A1 | 10/2019 | Oba | |
| 2020/0125969 A1* | 4/2020 | Briggs | G01S 17/88 |
| 2020/0239003 A1* | 7/2020 | Sobhany | H04L 12/40 |

(Continued)

*Primary Examiner* — Peter D Nolan
*Assistant Examiner* — Wae L Louie
(74) *Attorney, Agent, or Firm* — Christopher G. Darrow; Darrow Mustafa PC

(57) ABSTRACT

Systems, methods, and other embodiments described herein relate to improving passenger compartment air quality in a vehicle. In one embodiment, a method includes, responsive to acquiring sensor data that includes at least air quality information about a surrounding environment of an ego vehicle, analyzing the sensor data to determine whether the air quality information satisfies an action threshold specifying that air around the ego vehicle is of a poor quality. The method includes identifying a source of the air having the poor quality, including whether a leading vehicle in front of the ego vehicle is the source. The method includes generating a response to the air having the poor quality according to the source. The method includes controlling the ego vehicle according to the response.

20 Claims, 4 Drawing Sheets

(56) References Cited

U.S. PATENT DOCUMENTS

| | | | |
|---|---|---|---|
| 2020/0242421 A1* | 7/2020 | Sobhany | B60W 50/08 |
| 2021/0094577 A1* | 4/2021 | Shalev-Shwartz | B60W 40/02 |
| 2021/0155070 A1 | 5/2021 | McNew | |
| 2021/0262808 A1* | 8/2021 | Wang | G06V 20/588 |
| 2021/0403019 A1* | 12/2021 | Kim | H04W 4/48 |
| 2022/0009318 A1 | 1/2022 | Schmidt et al. | |
| 2024/0051370 A1* | 2/2024 | Ljungblad | B60H 1/00849 |
| 2024/0239151 A1* | 7/2024 | Patenaude | B60H 1/00985 |
| 2024/0239375 A1* | 7/2024 | Kuehner | B60H 1/008 |
| 2024/0239380 A1* | 7/2024 | Kuehner | B60W 50/14 |

* cited by examiner

# SYSTEMS AND METHODS FOR AVOIDANCE OF EXTERNAL ODORS IN A VEHICLE

TECHNICAL FIELD

The subject matter described herein relates, in general, to improving passenger comfort and health within a vehicle and, more particularly, to detecting the presence of poor-quality air (e.g., bad odors, fumes, etc.) and controlling the vehicle to mitigate the poor-quality air.

BACKGROUND

Hazards can take different forms when driving a vehicle. For example, hazards can include explicit threats to the vehicle, such as objects or other vehicles with which the vehicle may collide. Further threats can include weather, malicious individuals, and so on. In general, all of the noted hazards have some type of mitigation system in place in order to facilitate the safety of the vehicle and passengers. However, a hazard that is not generally considered is the air that may be directed into the passenger compartment of the vehicle. That is, in various circumstances, the outside air around a vehicle may be of a poor quality or have a character that the passengers do not wish to experience for various reasons. In some instances, the air may include foul odors or noxious fumes from a leading vehicle in front of the vehicle. In other circumstances, the air may include smoke, or other chemicals from the surrounding environment. In both cases, passengers of the vehicle may be negatively affected by the poor quality air. Accordingly, there remains a need to overcome the noted difficulties.

SUMMARY

In various embodiments, example systems and methods relate to a manner of improving passenger compartment air quality. As previously noted, a vehicle may encounter different hazards some of which are open and obvious while others may have a more elusive source. In particular, the source of odors/fumes that passengers of a vehicle may encounter are at times difficult to identify. In any case, odors, fumes, particulate matter, and other aspects that negatively impact air quality are generally undesirable and can have varying effects on the passengers of a vehicle. However, as noted, vehicles do not generally include mechanisms for sensing the presence of poor quality air nor are there available mechanisms to mitigate the poor quality air.

Therefore, in one or more embodiments, an inventive system is disclosed that improves passenger comfort in an ego vehicle by abating instances of poor quality air. In particular, the system functions to iteratively sample and assess air quality. That is, the ego vehicle includes, in at least one configuration, one or more air quality sensors. The air quality sensors may monitor for the presence of different compounds in the air in order to detect when the different compounds are present in the ego vehicle and levels at which the different compounds are present. Thus, the system can compare the measurements from the sensor(s) against an action threshold to determine when the air quality has degraded to a level of being poor when action is needed.

Accordingly, the response undertaken by the ego vehicle varies depending on the particular source of the poor air. As such, the system analyzes sensor data about the surrounding environment to identify the source of the air pollution. In one approach, the system performs object detection and recognition using, for example, images, LiDAR data, radar data, and other sensor data that may be available to the system. Generally, the system applies, for example, deep learning techniques to the data to identify whether a leading vehicle is present and characteristics about the leading vehicle that correlate with the detected air quality. For example, the system may identify the presence of smoke, cargo and a type of cargo, a type of the vehicle (e.g., a garbage truck, a livestock hauler, etc.). In yet further examples, the system may access information about a locality and whether there are wildfires, manufacturing plants, and so on. The system then assesses the findings and generates a response according to the determined source.

When the system determines that a leading vehicle is the source of the air quality, the system, in one approach, generates a response that includes a maneuver to avoid air from the leading vehicle. For example, the system may generate the maneuver to increase a distance between the leading vehicle and the ego vehicle. In a further example, the maneuver can include an overtaking maneuver or a lane change maneuver to move the ego vehicle out of an air stream of the leading vehicle. As a further aspect, the response may include closing ventilation from external air, activating air cleaning/filtering, and so on. In any case, the system can then control the ego vehicle to automatically (e.g., autonomous or semi-autonomous control of the vehicle to perform the maneuver) implement the response. In this way, the system improves passenger compartment air quality through a process of detection and mitigation via automated maneuvering and control of air systems of the vehicle.

In one embodiment, an air quality system for improving passenger compartment air quality is disclosed. The air quality system includes one or more processors and a memory communicably coupled to the one or more processors. The memory stores a control module including instructions that, when executed by the one or more processors, cause the one or more processors to, responsive to acquiring sensor data that includes at least air quality information about a surrounding environment of an ego vehicle, analyze the sensor data to determine whether the air quality information satisfies an action threshold specifying that air around the ego vehicle is of a poor quality. The control module includes instructions to identify a source of the air having the poor quality when the action threshold is satisfied, including whether a leading vehicle in front of the ego vehicle is the source. The control module includes instructions to generate a response to the air having the poor quality according to the source. The control module includes instructions to control the ego vehicle according to the response.

In one embodiment, a non-transitory computer-readable medium for improving passenger compartment air quality and including instructions that, when executed by one or more processors, cause the one or more processors to perform one or more functions is disclosed. The instructions include instructions to, responsive to acquiring sensor data that includes at least air quality information about a surrounding environment of an ego vehicle, analyze the sensor data to determine whether the air quality information satisfies an action threshold specifying that air around the ego vehicle is of a poor quality. The instructions include instructions to identify a source of the air having the poor quality when the action threshold is satisfied, including whether a leading vehicle in front of the ego vehicle is the source. The instructions include instructions to generate a response to the air having the poor quality according to the source. The instructions include instructions to control the ego vehicle according to the response.

In one embodiment, a method is disclosed. In one embodiment, the method includes, responsive to acquiring sensor data that includes at least air quality information about a surrounding environment of an ego vehicle, analyzing the sensor data to determine whether the air quality information satisfies an action threshold specifying that air around the ego vehicle is of a poor quality. The method includes identifying a source of the air having the poor quality, including whether a leading vehicle in front of the ego vehicle is the source. The method includes generating a response to the air having the poor quality according to the source. The method includes controlling the ego vehicle according to the response.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
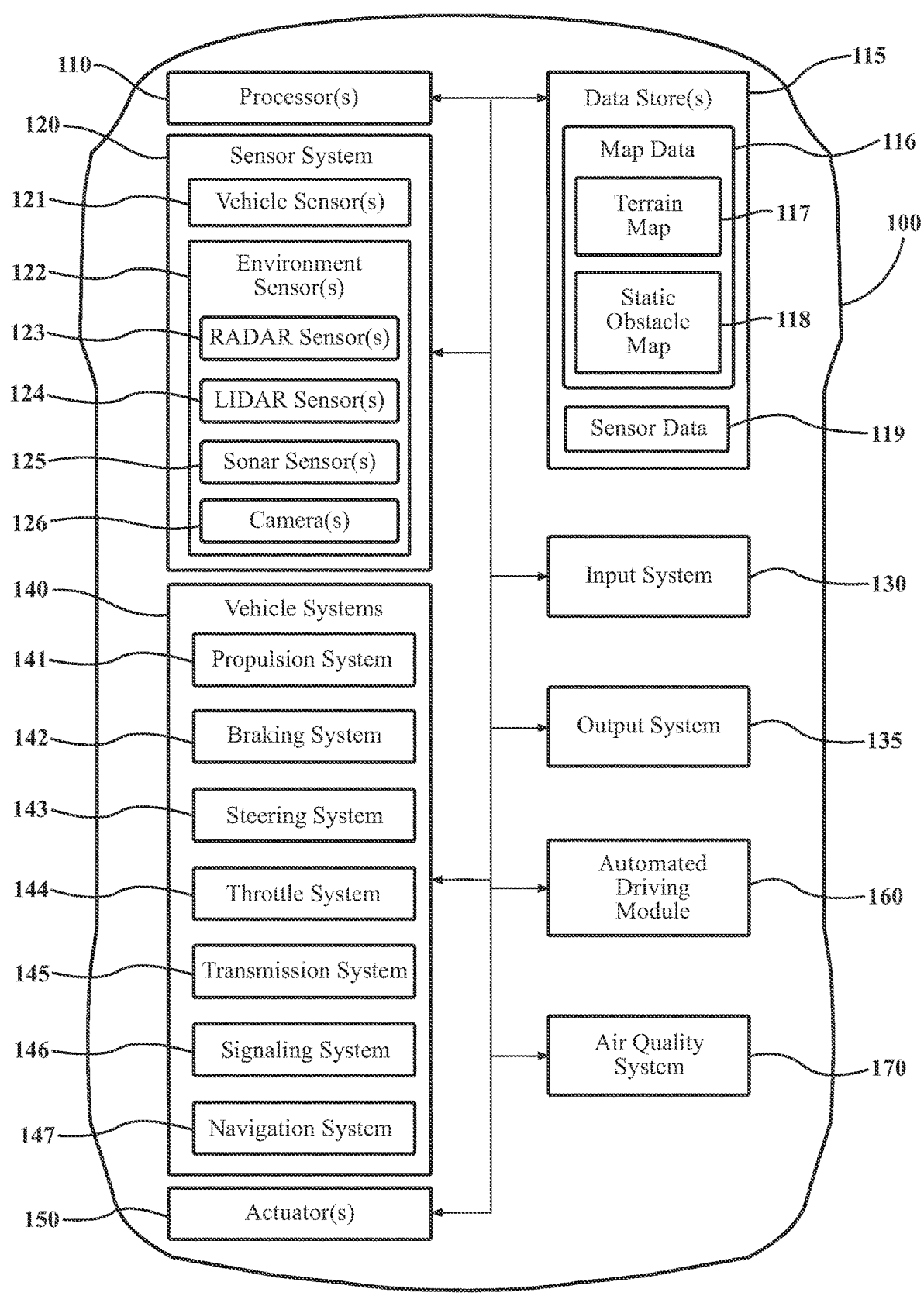
FIG. 1 illustrates one embodiment of a vehicle within which systems and methods disclosed herein may be implemented.

Systems, methods, and other embodiments associated with a manner of improving passenger compartment air quality are disclosed. As previously noted, a vehicle may encounter different hazards that may include odors/fumes or other air pollution, which passengers of a vehicle may find unpleasant or simply unhealthy. However, as noted, vehicles do not generally include mechanisms for sensing the presence of polluted air nor are mechanisms available to mitigate the poor quality air.

Therefore, in one or more embodiments, an air quality system is disclosed that improves passenger comfort and health in an ego vehicle by abating instances of air pollution. In particular, the system functions to iteratively sample and assess air quality. The ego vehicle can include, in various configurations, one or more air quality sensors. The air quality sensors may separately monitor for the presence of different compounds in the air. Thus, the system uses measurements from the air quality sensors to determine which pollutants are present and at what levels the different compounds of the pollutants are present. The system uses the measurements to determine whether a combination of sensed compounds indicates poor air quality. In one approach, the system applies an action threshold as a comparison against the measurements to determine when the air quality has degraded to a level of being poor, and thus when action is needed.

Accordingly, the air quality system functions to enact a response to the poor quality air. In at least one approach, the response undertaken by the ego vehicle varies depending on the particular source of the poor air. As such, the system analyzes sensor data about the surrounding environment to identify the source of the air pollution. In one approach, the system performs object detection and recognition using, for example, images, LiDAR data, radar data, and other sensor data that may be available to the system. Generally, the system applies, for example, deep learning techniques to the data to identify whether a leading vehicle is present and characteristics about the leading vehicle that correlate with the detected air quality. For example, the system may identify the presence of smoke and a point of origin for the smoke, cargo and a type of the cargo, a type of the leading vehicle (e.g., a garbage truck, a livestock hauler, a dump truck, etc.). In yet further examples, the system may access information about a locality and whether there are wildfires, manufacturing plants, or other sources air pollution proximate to a location of the ego vehicle. As part of identifying whether the source is from something other than a leading vehicle, the air quality system may further consider weather data (e.g., wind direction) and determine whether the wind direction corresponds to the noted facilities. The system then assesses the findings and generates a response according to the determined source.

For example, when the system determines that a leading vehicle is the source of the poor air quality, which may occur when the system correlates a particular type of cargo with the leading vehicle, the system generates a response that includes a maneuver to avoid air from the leading vehicle. For example, the system may generate the maneuver to increase a distance between the leading vehicle and the ego vehicle. In a further example, the maneuver can include an overtaking maneuver or a lane change maneuver to move the ego vehicle out of an air stream of the leading vehicle. As a further aspect, when, for example, the source of the poor quality air cannot be directly attributed to a leading vehicle, the system may generate the response to include closing ventilation from external air, activating air cleaning/filtering, and so on. In any case, the system can then control the ego vehicle to automatically implement the response. In this way, the system improves passenger compartment air quality through a process of detection and mitigation via automated maneuvering and/or control of air systems of the vehicle.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any device that, for example, transports passengers. In various approaches, the vehicle 100 may be an automated vehicle. As used herein, an automated vehicle refers to a vehicle with at least some automated driving functions. Thus, the vehicle 100 may operate autonomously, semi-autonomously, or with the assistance of various advanced driving assistance systems (ADAS) (e.g., adaptive cruise control). Further, the vehicle 100 may be a connected vehicle that is capable of communicating wirelessly with other devices, such as other connected vehicles, infrastructure elements (e.g., roadside units), cloud-computing elements, and so on. Moreover, while the present disclosure is generally described in relation to the vehicle 100, in yet further approaches, the noted systems and methods disclosed herein may be implemented as part of other entities, such as electronic devices that are not associated with a particular form of transport but are instead embedded as part of a mobile electronic device that can be, for example, carried by an individual and that may function independently or in concert with additional systems (e.g., sensors) of other devices.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within the vehicle 100, while further components of the system are implemented within a cloud-based environment, as discussed further subsequently.

Some of the possible elements of the vehicle 100 are shown in FIG. 1 and will be described along with subsequent figures. However, a description of many of the elements in FIG. 1 will be provided after the discussion of FIGS. 2-4 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 100 includes an air quality system 170 that is implemented to perform methods and other functions as disclosed herein relating to determining the quality of air surrounding the vehicle 100, identifying the source of any air having a poor quality, and generating a response in order to mitigate the air.

Moreover, the air quality system 170, as provided for within the vehicle 100, functions in cooperation with, for example, a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via a communication protocol, such as a WiFi, DSRC, V2I, V2V, or another suitable protocol for communicating between the vehicle 100 and other entities in a cloud environment. Moreover, the communication system 180, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server). In any case, the air quality system 170 can leverage various wireless communication technologies to provide communications to other entities, such as members of the cloud-computing environment, which may provide useful information in assessing air quality and a source of any poor quality air that is detected.

Figure 2:
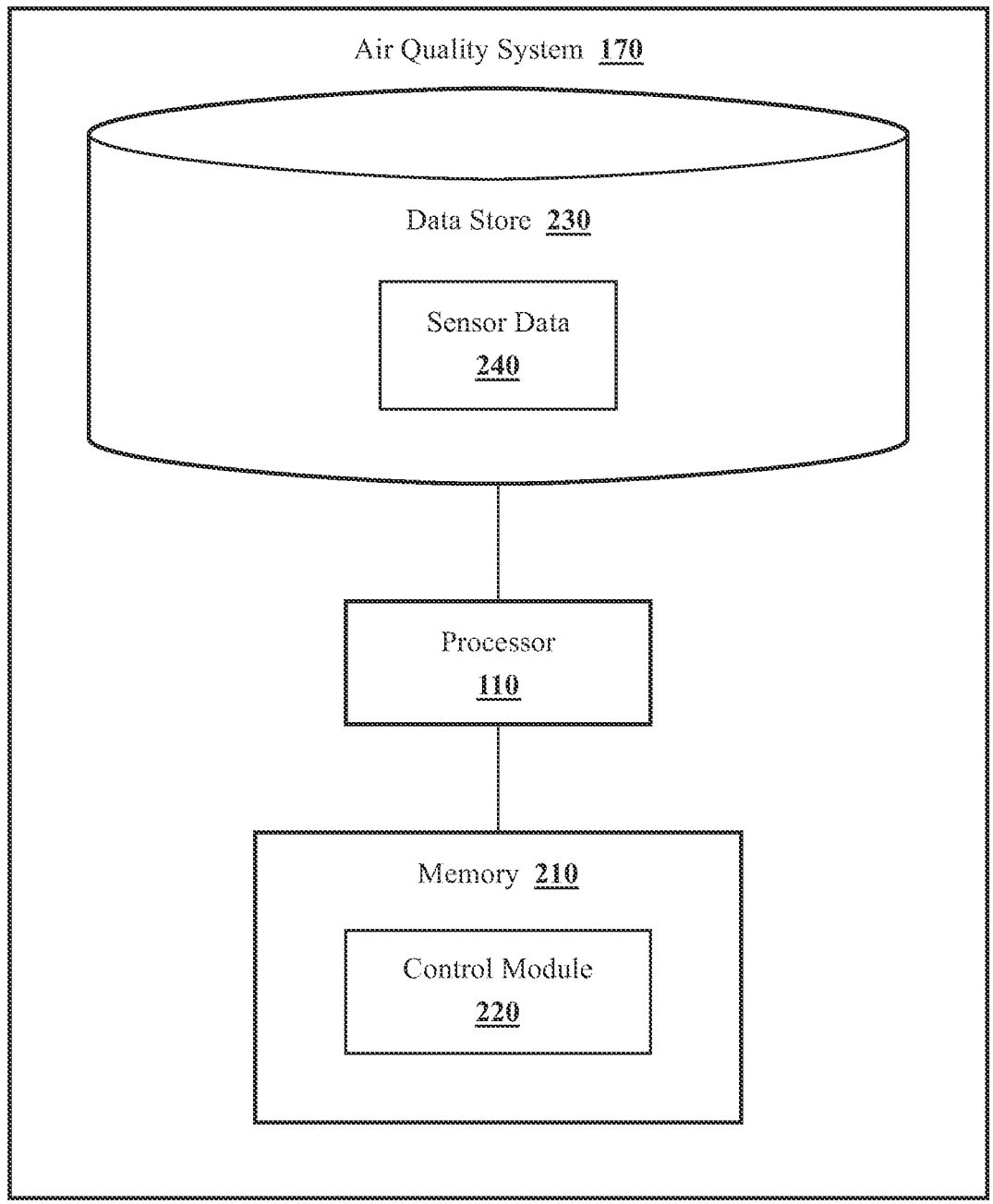
FIG. 2 illustrates one embodiment of an air quality system associated with improving air quality within a passenger compartment of a vehicle.

With reference to FIG. 2, one embodiment of the air quality system 170 is further illustrated. The air quality system 170 is shown as including a processor 110 from the vehicle 100 of FIG. 1 for purposes of explanation and discussion. However, it should be appreciated that the processor 110 may be a part of the air quality system 170, the air quality system 170 may include a separate processor from the processor 110 of the vehicle 100 or the air quality system 170 may access the processor 110 through a data bus or another communication path. In further aspects, the processor 110 is a cloud-based resource. Thus, the processor 110 may communicate with the air quality system 170 through a communication network or may be co-located with the air quality system 170. In one embodiment, the air quality system 170 includes a memory 210 that stores a control module 220. The memory 210 is a random-access memory (RAM), read-only memory (ROM), a hard-disk drive, a flash memory, or other suitable memory (either volatile or non-volatile) for storing the control module 220 and/or other information used by the air quality system 170. The control module 220 is, for example, computer-readable instructions within the physical memory 210 that, when executed by the processor 110, cause the processor 110 to perform the various functions disclosed herein. Accordingly, in at least one configuration, the control module 220 includes structure imparted by the memory 210 by virtue of being integrated therein. That is, in one configuration, the control module 220 is part of the memory 210.

Continuing with FIG. 2 and a general embodiment of the air quality system 170, in one or more arrangements, the air quality system 170 includes a data store 230. The data store 230 is, in one embodiment, an electronic data structure (e.g., a database) stored in the memory 210 or another electronic memory and that is configured with routines that can be executed by the processor 110 for analyzing stored data, providing stored data, organizing stored data, and so on. Thus, in one embodiment, the data store 230 stores data used by the module 220 in executing various functions. In one embodiment, the data store 230 includes the sensor data 240, and/or other information that is used by the control module 220, such as various machine-learning models for perception, an action threshold, etc. It should be appreciated that while the data store 230 is shown as including the sensor data 240, in various configurations, the data store 230 includes additional information.

In any case, the control module 220 includes instructions that function to control the processor 110 to acquire the sensor data 240 about a surrounding environment of the vehicle 100. In any case, the air quality system 170 captures observations of the surrounding environment in the form of the sensor data 240 that the air quality system 170 processes into determinations about air quality, the presence of surrounding vehicles (e.g., a leading vehicle), and so on. Accordingly, the control module 220 generally includes instructions that cause the processor 110 to control one or more sensors of the vehicle 100 to generate an observation about the surrounding environment. Broadly, an observation, as acquired by the control module 220, is information about a particular driving environment (e.g., roadway, etc.) and objects present in the driving environment as perceived by various sensors of the vehicle 100. Thus, the observation is generally a group of one or more data that are processed into a meaningful form. It should be appreciated that to implement the present approach, the vehicle 100 includes at least one sensor that provides information from which determinations about air quality can be derived. Thus, while an air quality sensor is generally included, in one or more configurations, the vehicle 100 does not include an explicit air quality sensor but instead relies on inferences from other environmental sensors, such as cameras. As one example, a camera may produce images of a leading vehicle that depicts particular cargo (e.g., livestock, manure, etc.), a particular type of vehicle (e.g., a garbage truck), and so on. From identification of the characteristics of the leading vehicle alone, in at least one embodiment, the The air quality sensor may be comprised of multiple separate sensors. That is, in order to sense various different chemical compounds, particulate levels, and so on, the vehicle 100 may include a plurality of individual sensors that separately sense respective compounds. For example, the air quality sensor can include separate sensing mechanisms for, hydrogen sulfide, ammonia, mercaptan, sulfur compounds, silicon compounds, organic solvents (e.g., Toluene), volatile organic compounds (VOCs), cigarette smoke, vehicle emissions, chlorofluorocarbons, concentrated chlorides, ethanol, acetone, particulate levels, and so on.

The control module 220, in one embodiment, controls respective sensors of the vehicle 100 to provide data inputs in the form of the sensor data 240. The control module 220 may further process the sensor data 240 into separate observations of the surrounding environment. For example, the control module 220, in one approach, fuses data from separate sensors to provide an observation about a particular aspect of the surrounding environment. By way of example, the sensor data 240 itself, in one or more approaches, may take the form of separate images, radar returns, LiDAR returns, measurements from air quality sensors, and so on. The control module 220 may derive determinations (e.g., location, pose, characteristics, etc.) from the sensor data 240 and fuse the data for separately identified aspects of the surrounding environment, such as surrounding vehicles, pedestrians, and so on. The control module 220 may further extrapolate the sensor data 240 into an observation by, for example, correlating the separate instances of sensor data into a meaningful observation about an object beyond an instantaneous data point. For example, the control module 220 may track a leading vehicle over many data points to provide an indication of a path of the leading vehicle relative to the vehicle 100. As a further aspect, the control module 220 may derive characteristics of the surrounding objects from the sensor data 240, such as a vehicle type, what cargo a vehicle is carrying, a condition of the vehicle, and so on.

Additionally, while the control module 220 is discussed as controlling the various sensors to provide the sensor data 240, in one or more embodiments, the module 220 can employ other techniques that are either active or passive to acquire the sensor data 240. For example, the control module 220 may passively sniff the sensor data 240 from a stream of electronic information provided by the various sensors or other modules/systems in the vehicle 100 to further components within the vehicle 100. Moreover, as noted, the control module 220 can undertake various approaches to fuse data from multiple sensors when providing the sensor data 240. Thus, the sensor data 240, in one embodiment, may represent a combination of perceptions acquired from multiple sensors.

Of course, depending on the sensors that the vehicle 100 or other entity includes, the available sensor data 240 that the air quality system 170 can harvest may vary. As one example, according to a particular implementation, the vehicle 100 may include different types of cameras or placements of multiple cameras. When acquiring the sensor data 240, the control module 220 may acquire various electronic inputs that originate from the vehicle 100, which may be stored in the data store 230 of the air quality system 170 as the sensor data 240 and processed according to various algorithms, such as machine learning algorithms, statistical analysis approaches, heuristics, and so on. Accordingly, the air quality system 170, in one approach, uses the noted sensor data 240 along with perceptions derived from the sensor data 240 to identify aspects about the surrounding environment, including aspects about the air and surrounding objects. It should be appreciated that, in general, the determination about air quality is separate from observations of the surrounding environment that include classification/localization of objects.

For example, in various implementations, the control module 220 includes instructions to analyze the sensor data 240, and, in particular, air quality measurements from an air quality sensor of the vehicle 100. For purposes of discussion, consider the arrangement 300 of vehicles shown in FIG. 3. As shown, the vehicle 100 is driving along a roadway behind a leading vehicle 310. The leading vehicle 310 is carrying cargo 320 that is emitting odors that are carried to the vehicle 100. Because the vehicle 100 is not sealed from outside air intrusion and also may provide direct ventilation of outside air into the passenger compartment, the air that passes over the cargo 320 is able to enter the vehicle 100, thereby carrying noxious odors/fumes into the vehicle 100. In a similar fashion, smoke, exhaust, and other compounds may also enter the vehicle 100.

Accordingly, the air quality sensor of the vehicle 100 is positioned in order to sample outside air that may enter the vehicle 100. Thus, the placement of the air quality sensor may vary according to a particular implementation, such as being placed at an opening of a vent to the interior of the vehicle 100, at a forward location (e.g., front grille) of the vehicle 100, or in another location that is appropriate for sensing air that may infiltrate the passenger compartment. In any case, the air quality sensor generates measurements of different compounds that are in the air as part of the sensor data 240. Similar to the acquisition of other portions of the sensor data 240, the control module 220 acquires the air quality measurements iteratively at, for example, a defined interval in order to sense when changes in air quality occur.

Figure 3:
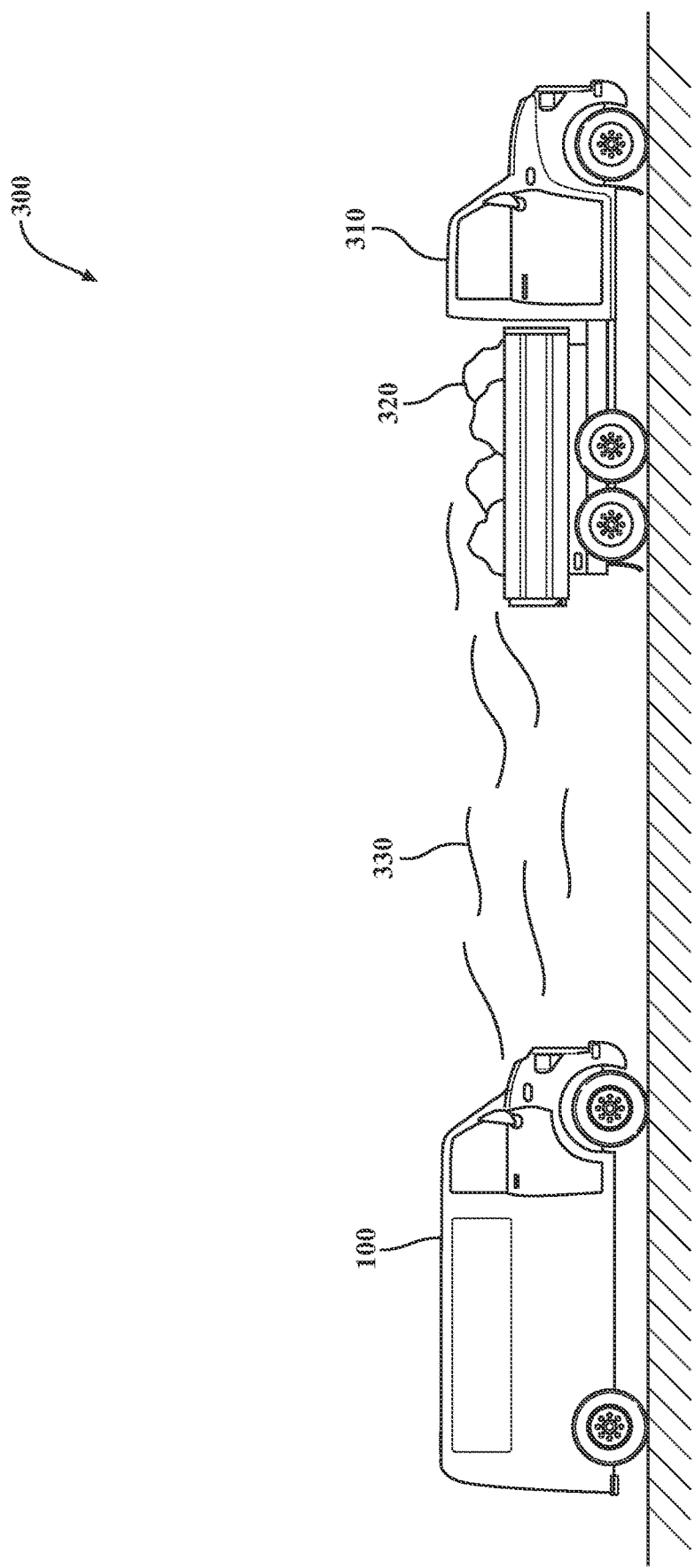
FIG. 3 illustrates a diagram of an ego vehicle following a leading vehicle that is causing polluted air to enter the ego vehicle.

Accordingly, as shown in FIG. 3, the air quality sensor of the vehicle 100 iteratively samples air 330 that, in the instant example, includes noxious odors from the cargo 320. As will be discussed in greater detail subsequently, the control module 220 compares the measurements against an action threshold in order to determine when the air quality is poor and thus necessitates a response to abate any impact on passengers of the vehicle 100.

In any case, the control module 220 further processes the sensor data 240 to derive additional observations about the surrounding environment, including identification of a lead vehicle, if present, and characteristics thereof. In at least one arrangement, the control module 220 applies a prediction model that analyzes the sensor data 240 to provide inferences about objects in the surrounding environment. The prediction model is one or more machine learning algorithms that perform object detection, classification, attribute analysis, and so on. The prediction model, in further arrangements, also includes additional components or another sub-model that accepts outputs about objects and determines whether the objects include a leading vehicle, and specific characteristics of the leading vehicle. As used herein, the term "leading vehicle" refers to a vehicle that is traveling ahead of the vehicle 100 and that may thus effect air encountered by the vehicle 100. While in various circumstances, a leading vehicle is directly in front of the vehicle 100 (i.e., traveling within a same lane), in further occurrences, the leading vehicle may be situated forward of the vehicle 100 in an adjacent lane while traveling in the same direction as the vehicle 100. Thus, the leading vehicle (e.g., vehicle 310) is considered to be generally forward the ego vehicle 100 such that air from the leading vehicle is imparted onto the vehicle 100.

In general, the form of the prediction model may vary according to a particular implementation. For example, the prediction model may be a single end-to-end network comprised of multiple different output heads, a variety of distinct sub-models, and so on. The particular form of the model(s) may also vary and may include convolutional networks, recurrent networks, generative networks, and so on. Furthermore, a process for training the prediction model for use within the vehicle 100 may involve reinforcement learning, supervised learning, and so on.

Accordingly, the control module 220 is applying the prediction model to extract features from the sensor data 240 that identify the presence of objects and characteristics of the objects that provide for classifying objects as vehicles, determining whether the vehicles are leading vehicles, and further deriving characteristics that provide for identifying a source of poor quality air. The features may be intrinsic features (e.g., pose, actions, etc.) and extrinsic features (e.g., car key points indicating different configurations of doors, etc.). By way of example, the characteristics of the leading vehicle can include whether the vehicle is a pickup truck, a commercial hauling vehicle, a special use vehicle (e.g., garbage truck), and so on. The characteristics about the leading vehicle may include identification of smoke associated with the leading vehicle, a general condition of the vehicle (e.g., worn, damaged, dirty, etc.), a presence of cargo and a type of the cargo, and so on.

Thus, with continued reference to FIG. 3, the control module 220 analyzes the sensor data 240 collected from sensors, such as cameras, LiDAR, etc., to detect the presence of objects and determine whether a leading vehicle is present. Of course, as shown in FIG. 3, the control module 220 detects the presence of the leading vehicle 310 and further derives characteristics about the vehicle 310. In particular, the control module 220 is able to determine that the leading vehicle 310 is truck that is carrying exposed cargo 320. The control module 220 can then infer, using the prediction model, that the cargo 320 is manure, which is a source of sensed odors in the air. In this way, the control module 220 not only identifies when the vehicle 100 encounters poor quality air but can further identify whether a source of the air is proximate to the vehicle, such as in the case of the leading vehicle 310.

As an additional aspect of the air quality system 170, the control module 220, in one or more arrangements, also analyzes the sensor data 240 for mitigating factors that may influence a determination about the leading vehicle being a source of poor-quality air. For example, the control module 220, in one or more arrangements, accesses additional sources of information about the surrounding environment to determine other potential nearby sources. The control module 220 can access information regarding nearby facilities (e.g., sewage treatment plants, farms, manufacturing facilities, etc.) by using map data, weather data, and so on. In a further aspect, the control module 220 can access real-time air pollution reports, wildfire reports, red tide reports, or other sources of information that include indicators about the quality of air in a particular location. The control module 220 may correlate the types of air pollution from the noted information sources against detected compounds from the air quality sensor and in light of the directly observed surrounding environment (e.g., the presence of a leading vehicle and characteristics of the leading vehicle) to assign the poor-quality air to a particular source. The control module 220 can analyze the locations of various facilities and current wind directions to further determine whether a leading vehicle is the source versus a nearby facility. In this way, the air quality system 170 can assess aspects about the surrounding environment and determine a source of air having a poor quality in order to better focus a response.

Figure 4:
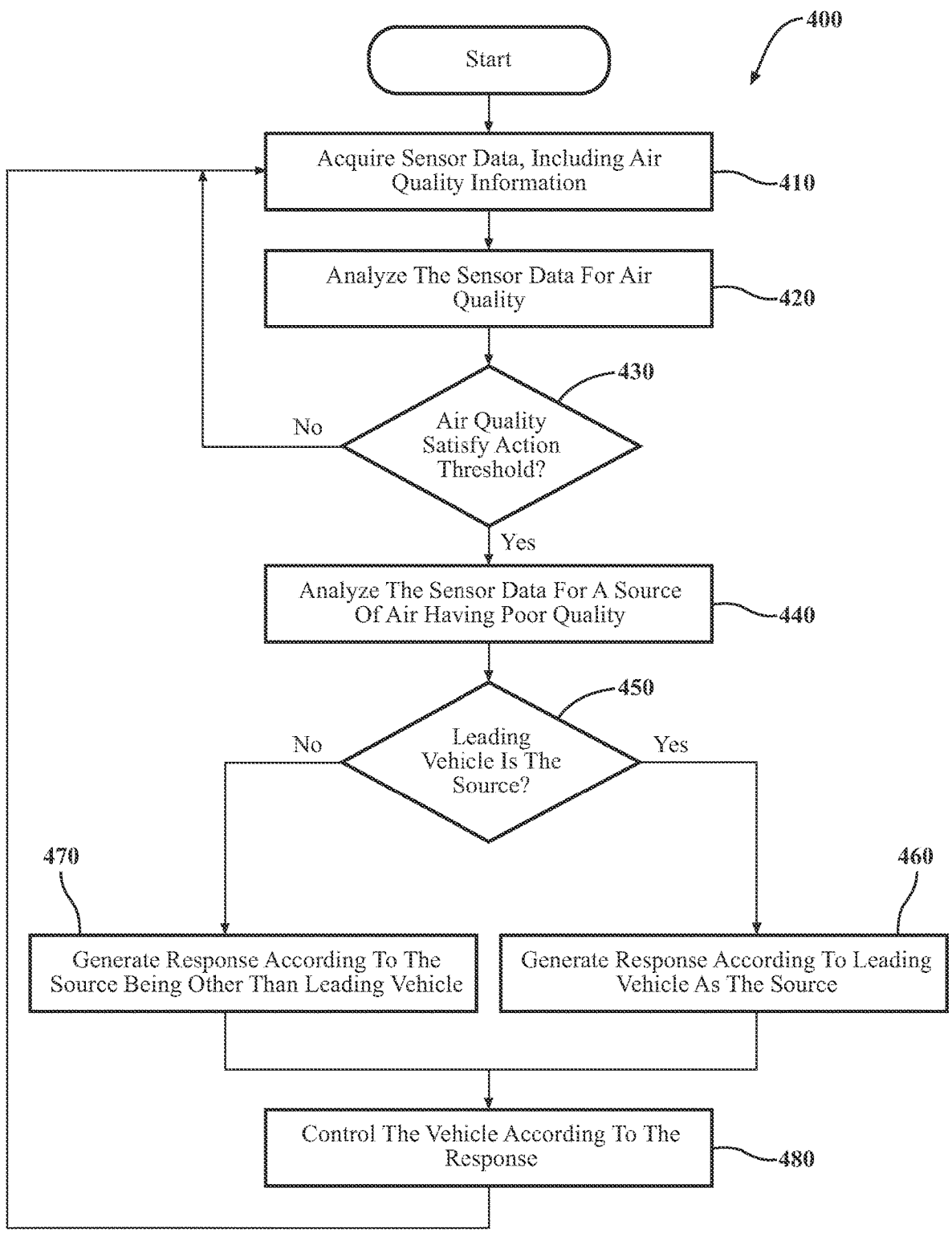
FIG. 4 is a flowchart illustrating one embodiment of a method associated with identifying a source of air pollution and mitigating the effects on a vehicle.

Additional aspects about detecting the presence of air having a poor quality and infers the source will be described in relation to FIG. 4. FIG. 4 illustrates a flowchart of a method 400 that is associated with analyzing sensor data to identify a source of air pollution. Method 400 will be discussed from the perspective of the air quality system 170 of FIGS. 1-2 as implemented by an entity, such as a vehicle that may be in communication within the cloud-based environment. While method 400 is discussed in combination with the air quality system 170, it should be appreciated that the method 400 is not limited to being implemented within the air quality system 170 but is instead one example of a system that may implement the method 400. Furthermore, while the method is illustrated as a generally serial process, various aspects of the method 400 can execute in parallel to perform the noted functions.

At 410, the control module 220 acquires the sensor data 240 about a surrounding environment of the vehicle 100 (also referred to herein as the ego vehicle). It should be appreciated that acquiring the sensor data 240, while shown as a single discrete instance, generally occurs as a series of observations over time. In this way, the control module 220 is able to capture information over time (e.g., a time series of air quality measurements) in addition to instantaneous observations. In any case, the sensor data 240 is information from sensors of the vehicle 100 that embodies aspects of an area around the vehicle 100. Of course, in further aspects, the sensor data 240 may also include information from other devices, including cloud-based sources (e.g., map data, government reporting systems, etc.).

As discussed previously, the sensor data 240 generally includes two sets of information. The sensor data 240 includes observations about objects in the surrounding environment (e.g., vehicles), including characteristics and locations of the objects. The sensor data 240 also includes air quality information. The air quality information includes, in various configurations, information about odors, fumes, particulate levels, and so on. In at least one approach, the air quality information includes information about specific compounds that are present in the air and a level at which the compounds are detected (e.g., parts-per-million (PPM)). Each separate compound may be associated with a different actionable level. For example, while certain compounds may be present in the air at low levels and are not considered harmful at the low levels, when the compounds reach higher levels, the compounds may become toxic or a nuisance to passengers. For example, carbon monoxide, hydrogen sulfide and other compounds are generally present in the air but become toxic to humans at higher levels. As a further consideration, while certain compounds alone may not be toxic the presence of multiple compounds together at low levels become toxic or a nuisance to passengers. Thus, the control module 220 functions to monitor the air for the presence of different compounds and associated levels both individually and in combination. Overall, the control module 220 functions to acquire the sensor data 240 on an iterative basis at, for example, defined intervals in order to provide current observations and trends in observations about the surrounding environment of the vehicle.

At 420, the control module 220 processes the sensor data 240 in regards to at least the air quality information. As noted above, the sensor data 240 may be acquired in an iterative manner, thus, blocks 410-450 may generally occur in an iterative manner and in parallel with separate acquisitions of the sensor data 240 and determinations about the sensor data 240 generated at each time step or every x time steps, where x is defined according to the particular implementation. In any case, the control module 220 analyzes the sensor data 240 to determine whether the air quality information satisfies an action threshold specifying that air around the ego vehicle 100 is of a poor quality. The action threshold, in at least one approach, defines levels of the sensed compounds that are at least a nuisance to the passengers. Thus, the action threshold may be defined separately for the separate compounds sensed by the air quality sensor. Moreover, while the present disclosure describes nuisance levels, the levels may be adapted for particular compounds such that action is taken prior to the compounds reaching a noticeable level by a passenger of the vehicle 100.

In general, the action threshold can be defined differently depending on the implementation, a sensitivity of a passenger, the compounds/particulates that are monitored, and so on. Moreover, while specific compounds are mentioned, the air quality information may also include particulate information for which the action threshold includes a separate threshold. Regarding satisfaction of the threshold itself, in general, the control module 220 determines that the air quality information for a particulate level and/or one or more compounds satisfy the action threshold when, for example, measurement(s) are equal to or exceed (e.g., are above) the action threshold.

At 430, the control module 220 determines whether the air quality information satisfies the action threshold. As noted, the action threshold may vary according to a class (e.g., type) of the compounds and/or particulates that have been detected. Thus, the control module 220, in one embodiment, determines the appropriate action threshold to apply according to the sensed compounds/particulates. Once the control module 220 determines the action threshold(s) to apply, the control module compares the action threshold (s) to the measured values for the compounds/particulates. If none of the values satisfy the action threshold (e.g., meet or exceed), then the control module 220 continues to monitor the surrounding environment by continuing with acquiring and assessing the sensor data 240 at 410-430. However, when one or more of the measurements satisfy the action threshold (s), the control module 220 proceeds with further analysis of the sensor data 240 at 440.

At 440, the control module 220 analyzes the sensor data 240 to determine aspects about a potential source of the poor air quality. In at least one arrangement, the control module 220 identifies a source of the air by considering aspects of the surrounding environment, including the presence of nearby vehicles (e.g., a leading vehicle) and other potential sources as identified from various information about a geographic area around the vehicle 100. For example, as noted previously, the control module 220 analyzes the sensor data 240 to identify whether a leading vehicle is present and characteristics about the leading vehicle that correspond with the poor quality of the air. In general, the control module 220 applies one or more deep neural networks (DNNs) to the sensor data 240 perform object detection, localization, and classification of the objects. Thus, the control module 220 determines whether objects are present, determines locations of the objects, and further determines sufficient information about the objects to classify the objects according to an ontological classification (e.g., pedestrian, bicycle, vehicle, etc.).

As a further output that may be selective according to the prior determinations, the control module 220 identifies aspects about the leading vehicle that may be indicative of the poor air quality. For example, the control module 220 determines a type of the vehicle, a condition of the vehicle, whether smoke is present around the vehicle, the presence of cargo or a trailer attached to the vehicle, and so on. In general, the control module 220 analyzes aspects of the vehicle that may be indicative of a source of pollutants in order to indicate a correlation. As yet a further aspect, in at least one arrangement, the control module 220 uses the detected aspects of the air (e.g., the compounds/particulates that satisfy the action threshold) as a basis for analysis of the surrounding. For example, the control module 220 upon identifying hydrogen sulfide may focus analysis on whether a leading vehicle is carrying manure or is septic waste vehicle. In this way, the control module 220 can better focus the analysis on relevant aspects to determine whether a correlation exits and identify a source.

Moreover, beyond analysis of the leading vehicle and other objects in the surrounding environment, the control module 220, in one approach, determines the presence of hazards within the surrounding environment that do not correspond to the leading vehicle. The hazards correspond with the noted secondary aspects of the environment, such as the location of polluting facilities (e.g., wastewater treatment facilities, manufacturing plants, ore processing facilities, chemical manufacturing, etc.), environmental hazards (e.g., red tide, wildfires, smog, etc.), chemical weapons, and so on. Similar to focusing of analysis of the leading vehicle, the control module 220 may further correlate the type of compounds/particulates with the different types of hazards in order to determine a source of the particular detected pollutant.

At 450, the control module 220 determines whether a leading vehicle is the source of the poor-quality air. In one arrangement, the control module 220 attempts to correlate the characteristics with the compound/pollutant according to known correlations as may be embodied within a DNN. That is, the control module 220, in one approach, includes a further DNN that accepts derived information about the surrounding environment and outputs a correlation confidence value that identifies whether or not the sensed compounds/particulates correspond with a leading vehicle, if present. In a further approach, the control module 220 may implement a heuristic that uses, for example, a lookup table including separate characteristics and corresponding compounds/characteristics in order to assess whether the sensed pollutants originate from a leading vehicle. When the control module 220 determines that the pollutants do correspond to a leading vehicle, then the control module 220 proceeds to generate a response associated to the identified context at 460. Otherwise, the control module 220 proceeds to generate a separate response at 470.

At 460, the control module 220 generates a response to the air having the poor quality according to the source being a leading vehicle. In particular, the control module 220 generates a maneuver for the vehicle to avoid the air from the leading vehicle. The maneuver that is generated can vary depending on the particular context. For example, depending on whether the vehicle 100 is traveling on a two-lane road, a four-lane highway, a rural country road, the presence of traffic, etc. In any case, the control module 220 determines the maneuver according to the current driving context (i.e., roadway configuration, traffic, weather, etc.) in order to mitigate the air pollution. In general, the maneuver is a trajectory for the vehicle 100 to perform that may include overtaking the leading vehicle, increasing a distance between the ego vehicle 100 and the leading vehicle, turning or performing another action to take an alternative route, and so on. In this way, the vehicle 100 is able to mitigate or wholly avoid effects of the air pollution.

At 470, the control module 220 generates a response according to the leading vehicle not being a source of the air pollution. In one approach, the control module 220 generates the response to automatically control a ventilation system of the ego vehicle 100 to exclude the air having the poor quality from a passenger compartment of the ego vehicle. That is, the response may include closing vents of the vehicle to recirculate air, closing windows of the vehicle 100, turning off ventilation within the vehicle 100, activating the ventilation to use filtering or more robust filtering (e.g., HEPA filters), or otherwise adapting ventilation systems of the vehicle 100 to avoid intake of the polluted air.

At 480, the control module 220 controls the ego vehicle 100 according to the response. In one approach, the control module 220 provides the response to an automated driving module 160 that implements the maneuver for the vehicle 100. In various embodiments, the level of automation may differ, thus, the automated aspects performed by the automated driving module 160 may also differ. For example, a simple maneuver, such as increasing the distance between the ego vehicle 100 and the leading vehicle may be undertaken by an ADAS (e.g., adaptive cruise control), while a more complex maneuver (e.g., overtaking the leading vehicle) may be undertaken by a higher level of automation (e.g., SAE level 3 or above). In a case where the vehicle is not able to fully perform the maneuver using built-in automation, the control module 220 may alert the driver and recommend the maneuver. In a further aspect, the response to control ventilation systems of the vehicle 100 may be undertaken for both circumstances where the source is the leading vehicle and when the source is not the leading vehicle in order to provide a comprehensive mitigation of the air pollution. In this way, the air quality system 170 improves passenger health and comfort through a process of monitoring and active mitigation of sources of air pollution relative to the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Of course, in further aspects, the vehicle 100 may be a manually driven vehicle that may or may not include one or more driving assistance systems, such as active cruise control, lane-keeping assistance, crash avoidance, and so on. In any case, "manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include various types of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the air quality system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, and/or the automated driving module(s) 160 may control some or all of these vehicle systems 140 and, thus, may be partially or fully autonomous.

The processor(s) 110, and/or the automated driving module(s) 160 can be operatively connected to communicate with the various vehicle systems 140 and/or individual components thereof. For example, returning to FIG. 1, the processor(s) 110, the air quality system 170, and/or the automated driving module(s) 160 can be in communication to send and/or receive information from the various vehicle systems 140 to control the movement, speed, maneuvering, heading, direction, etc. of the vehicle 100. The processor(s) 110, the air quality system 170, and/or the automated driving module(s) 160 may control some or all of these vehicle systems 140.

The processor(s) 110, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, and/or the automated driving module(s) 160 can control the direction and/or speed of the vehicle 100. The processor(s) 110, and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine the position and velocity of the vehicle 100. The automated driving module(s) 160 can determine the location of obstacles, obstacles, or other environmental features, including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the air quality system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An air quality system for improving passenger compartment air quality, comprising:
   one or more processors; and
   a memory communicably coupled to the one or more processors and storing:
   a control module including instructions that when executed by the one or more processors cause the one or more processors to:
   responsive to acquiring sensor data that includes at least air quality information about a surrounding environment of an ego vehicle, analyze, by the ego vehicle, the sensor data to determine whether the air quality information satisfies an action threshold specifying that air around the ego vehicle is of a poor quality;
   identify, by the ego vehicle, a source of the air having the poor quality when the action threshold is satisfied, including whether a leading vehicle in front of the ego vehicle is the source by actively perceiving the surrounding environment and correlating characteristics of the leading vehicle with the poor quality of the air;
generate a response to the air having the poor quality according to the source; and
control the ego vehicle according to the response.

2. The air quality system of claim 1, wherein the control module includes instructions to generate the response including instructions to generate a maneuver for the ego vehicle to avoid the air from the leading vehicle when the leading vehicle is present in front of the ego vehicle and is the source of the air having the poor quality.

3. The air quality system of claim 2, wherein the maneuver includes a trajectory for the ego vehicle to perform at least one of: overtaking the leading vehicle, and increasing a distance between the ego vehicle and the leading vehicle to mitigate an effect of the air on the ego vehicle, and
wherein the control module includes instructions to control the ego vehicle according to the response including instructions to automatically control a ventilation system of the ego vehicle to exclude the air having the poor quality from a passenger compartment of the ego vehicle.

4. The air quality system of claim 1, wherein the control module includes instructions to control the ego vehicle according to the response including instructions to autonomously control the ego vehicle to perform a maneuver that mitigates the poor quality of the air.

5. The air quality system of claim 1, wherein the control module includes instructions to identify the source of the air having the poor quality including instructions to analyze the sensor data to identify whether the leading vehicle is present and characteristics about the leading vehicle that correspond with the poor quality of the air, and
wherein the control module includes instructions to identify the source including instructions to analyze the sensor data to determine a presence of hazards within the surrounding environment that do not correspond to the leading vehicle.

6. The air quality system of claim 1, wherein the control module includes instructions to analyze the sensor data to determine whether the air quality information satisfies the action threshold including instructions to determine one or more of compounds and particulates present in the air and whether the one or more of compounds and particulates satisfy the action threshold according to a class of the one or more of compounds and particulates that have been detected.

7. The air quality system of claim 1, wherein the control module includes instructions to acquire the sensor data including instructions to control one or more sensors of the ego vehicle to perceive the surrounding environment.

8. The air quality system of claim 1, wherein the control module includes instructions to identify the source including instructions to perform object detection and localization on the sensor data to identify vehicles in the surrounding environment and locations of the vehicles relative to the ego vehicle.

9. A non-transitory computer-readable medium storing instructions for improving passenger compartment air quality and that, when executed by one or more processors, cause the one or more processors to:
responsive to acquiring sensor data that includes at least air quality information about a surrounding environment of an ego vehicle, analyze, by the ego vehicle, the sensor data to determine whether the air quality information satisfies an action threshold specifying that air around the ego vehicle is of a poor quality;
identify, by the ego vehicle, a source of the air having the poor quality when the action threshold is satisfied, including whether a leading vehicle in front of the ego vehicle is the source by actively perceiving the surrounding environment and correlating characteristics of the leading vehicle with the poor quality of the air;
generate a response to the air having the poor quality according to the source; and
control the ego vehicle according to the response.

10. The non-transitory computer-readable medium of claim 9, wherein the instructions to generate the response include instructions to generate a maneuver for the ego vehicle to avoid the air from the leading vehicle when the leading vehicle is present in front of the ego vehicle and is the source of the air having the poor quality.

11. The non-transitory computer-readable medium of claim 10, wherein the maneuver includes a trajectory for the ego vehicle to perform at least one of: overtaking the leading vehicle, and increasing a distance between the ego vehicle and the leading vehicle to mitigate an effect of the air on the ego vehicle, and
wherein the instructions to control the ego vehicle according to the response include instructions to automatically control a ventilation system of the ego vehicle to exclude the air having the poor quality from a passenger compartment of the ego vehicle.

12. The non-transitory computer-readable medium of claim 9, wherein the instructions to control the ego vehicle according to the response include instructions to autonomously control the ego vehicle to perform a maneuver that mitigates the poor quality of the air.

13. The non-transitory computer-readable medium of claim 9, wherein the instructions to identify the source of the air having the poor quality include instructions to analyze the sensor data to identify whether the leading vehicle is present and characteristics about the leading vehicle that correspond with the poor quality of the air, and
wherein the instructions to identify the source include instructions to analyze the sensor data to determine a presence of hazards within the surrounding environment that do not correspond to the leading vehicle.

14. A method, comprising:
responsive to acquiring sensor data that includes at least air quality information about a surrounding environment of an ego vehicle, analyzing, by the ego vehicle, the sensor data to determine whether the air quality information satisfies an action threshold specifying that air around the ego vehicle is of a poor quality;
identifying, by the ego vehicle, a source of the air having the poor quality, including whether a leading vehicle in front of the ego vehicle is the source by actively perceiving the surrounding environment and correlating characteristics of the leading vehicle with the poor quality of the air;
generating, by the ego vehicle, a response to the air having the poor quality according to the source; and
controlling the ego vehicle according to the response.

15. The method of claim 14, wherein generating the response includes generating a maneuver for the ego vehicle to avoid the air from the leading vehicle when the leading vehicle is present in front of the ego vehicle and is the source of the air having the poor quality.

16. The method of claim 15, wherein the maneuver includes a trajectory for the ego vehicle to perform at least one of: overtaking the leading vehicle, and increasing a distance between the ego vehicle and the leading vehicle to mitigate an effect of the air on the ego vehicle, and wherein the response includes automatically controlling a ventilation system of the ego vehicle to exclude the air having the poor quality from a passenger compartment of the ego vehicle.

17. The method of claim 14, wherein controlling the ego vehicle according to the response includes autonomously controlling the ego vehicle to perform a maneuver that mitigates the poor quality of the air.

18. The method of claim 14, wherein identifying the source of the air having the poor quality includes analyzing the sensor data to identify whether the leading vehicle is present and characteristics about the leading vehicle that correspond with the poor quality of the air, and wherein identifying the source includes analyzing the sensor data to determine a presence of hazards within the surrounding environment that do not correspond to the leading vehicle.

19. The method of claim 14, wherein analyzing the sensor data to determine whether the air quality information satisfies the action threshold includes determining one or more of compounds and particulates present in the air and whether the one or more of compounds and particulates satisfy the action threshold according to a class of the one or more of compounds and particulates that have been detected.

20. The method of claim 14, wherein acquiring the sensor data includes controlling one or more sensors of the ego vehicle to perceive the surrounding environment, and wherein identifying the source includes performing object detection and localization on the sensor data to identify vehicles in the surrounding environment and locations of the vehicles relative to the ego vehicle.

\* \* \* \* \*